United States Patent
Tong et al.

(10) Patent No.: US 7,529,305 B1
(45) Date of Patent: May 5, 2009

(54) COMBINATION OF SPACE-TIME CODING AND SPATIAL MULTIPLEXING, AND THE USE OF ORTHOGONAL TRANSFORMATION IN SPACE-TIME CODING

(75) Inventors: Wen Tong, Ottawa (CA); Michail G. Bakulin, Kirova (RU); Vitaly B. Kreyndelin, Moscow (RU); Alexander M. Shloma, Gagarina (RU); Yuriy S. Shinakov, Moscow (RU)

(73) Assignee: Nortel Networks Limited, St. Laurent, Quebec (CA)

( * ) Notice: Subject to any disclaimer, the term of this patent is extended or adjusted under 35 U.S.C. 154(b) by 887 days.

(21) Appl. No.: 10/399,859

(22) PCT Filed: Oct. 27, 2000

(86) PCT No.: PCT/RU00/00426

§ 371 (c)(1), (2), (4) Date: Aug. 29, 2003

(87) PCT Pub. No.: WO02/35762

PCT Pub. Date: May 2, 2002

(51) Int. Cl.
*H04K 1/10* (2006.01)

(52) U.S. Cl. .............. 375/260; 375/267; 375/295; 375/299; 455/101; 455/103

(58) Field of Classification Search .......... 375/267, 375/260, 295, 299
See application file for complete search history.

(56) References Cited

U.S. PATENT DOCUMENTS

| | | | |
|---|---|---|---|
| 6,351,498 B1 * | 2/2002 | Yamao et al. ............. | 375/260 |
| 6,377,631 B1 * | 4/2002 | Raleigh ..................... | 375/299 |
| 6,473,467 B1 * | 10/2002 | Wallace et al. ............ | 375/267 |
| 6,678,263 B1 * | 1/2004 | Hammons et al. ......... | 370/342 |
| 6,775,260 B1 * | 8/2004 | Dabak et al. .............. | 370/342 |
| 6,891,897 B1 * | 5/2005 | Bevan et al. .............. | 375/265 |
| 7,010,029 B1 * | 3/2006 | Naguib et al. ............. | 375/229 |
| 7,050,510 B2 * | 5/2006 | Foschini et al. ........... | 375/299 |
| 7,139,324 B1 * | 11/2006 | Ylitalo et al. ............. | 375/267 |
| 7,215,718 B1 * | 5/2007 | Calderbank et al. ....... | 375/299 |
| 2004/0013211 A1 * | 1/2004 | Lindskog et al. .......... | 375/347 |

FOREIGN PATENT DOCUMENTS

EP 0 905 920 A2 3/1999
EP 0 993 130 A2 4/2000

OTHER PUBLICATIONS

Hochwald, Marzetta; Space-Time Modulation for Unknown Fading; Proceedings of the SPIE, vol. 57, No. 8, Apr. 1999, pp. 10-19, XP000914262.
Yumin Zhang & R. Blum; Multistage Multiuser Detection for CDMA With Space-Time Coding; IEEE Workshop on Statistical Signal and Array Processing; Aug. 14-16, 2000, pp. 1-5, XP002174378.
Ben Lu; et al.; Iterative Receivers for Multiuser Space-Time Coding Systems; IEEE International Conference on Communications, Jun. 18-22, 2000, pp. 302-306, XP002174379.

* cited by examiner

*Primary Examiner*—Chieh M Fan
*Assistant Examiner*—Siu M Lee

(57) ABSTRACT

It is proposed to combine space-time coding and spatial multiplexing. Also, the use of orthogonal transformation matrices is proposed, which ensures that each bistream contributes to the signal on each antenna.

12 Claims, 8 Drawing Sheets

COMBINATION OF SPACE-TIME CODING AND SPATIAL MULTIPLEXING, AND THE USE OF ORTHOGONAL TRANSFORMATION IN SPACE-TIME CODING

FIELD OF THE INVENTION

The invention relates to systems and methods for performing layered space-time coding for wireless channels.

BACKGROUND OF THE INVENTION

With the explosion in the demand for wireless Internet services, a number of competing solutions have been developed. UMTS (Universal Mobile Terrestrial Service) standardization has lead to the 3 Gpp standard which offers a 2 Mbps data rate per sector. Work is underway on HSPDA (high speed data access), a higher speed packet data access variation. IS-2000, an evolution of IS-95 provides HDR (High Speed Data Rate) and 1XEV (1X Evolution) which allow wireless Internet browsing at a rate of 7.2 Mbps per sector. Notwithstanding these solutions, there is still the demand to push rates higher.

Recently, it has been proposed to use BLAST (Bell Labs Layered Space Time) which is a layered space-time coding approach, as a wireless data solution. Referring to FIG. 1, the basic concept behind this layered space-time coding approach involves, at the transmit side, a demultiplexer 10 which demultiplexes a primary data stream 11 into M data substreams of equal rate. Each of the M data streams is then encoded and modulated separately in respective coding/modulating blocks 12 (12A, 12B, ..., 12M) to produce respective encoded and modulated streams 13 (13A, 13B, ..., 13M). There are M transmit antennas 14 (14A, 14B, ..., 14M). A switch 16 periodically cycles the association between the modulated streams 13A, 13B, ..., 13M and the antennas 14A, 14B, ..., 14M. At the receive side, there are M antennas 18 (18A, 18B, ..., 18M) which feed into a beamforming/spatial separation/substruction block 20 which performs a spatial beamforming/nulling (zero forcing) process to separate the individual coded streams and feeds these to respective individual decoders 22 (22A, 22B, ..., 22M). The outputs of the decoders 22A, 22B, ..., 22M are fed to a multiplexer 24 which multiplexes the signals to produce an output 25 which is an estimate of the primary data stream 11.

There are a number of variations on this architecture. One is to modify the receiver antenna pre-processing to carry out MMSE (minimum mean square error) beamforming rather than nulling in order to improve the wanted signal SNR (signal-to-noise ratio) at the expense of slightly increased ISI (inter-symbol interference). Both the MMSE and nulling approaches normally have the disadvantage that some sort of diversity of the receiver antenna array is necessarily sacrificed in the beamforming process. In order to overcome this problem, layering of the receiver processing can be employed such that after the strongest signal has been decoded (typically using the Viterbi MLSE (maximum likelihood sequence estimation) algorithm) it is subtracted from the received antenna signals in order to remove the strongest signal. This process is iterated down until detection of the weakest signal requires no nulling at all, and its diversity performance is therefore maximized. A disadvantage with this layered approach is the same as that with all subtractive multi-user detection schemes, that the wrong subtraction can cause error propagation.

There are several types of layered space-time coding structures, including horizontal BLAST (H-BLAST), diagonal BLAST (D-BLAST) and vertical BLAST. They have identical performance for both optimal linear and non-linear receivers, assuming error control coding is not used in such systems. For optimal linear reception (linear maximum likelihood), these structures have the same SNR performances as those with only a single transmit antenna and a single receive antenna, but do offer the advantage of improved spectral efficiency.

In order to achieve this improved spectral efficiency, in such systems it would be advantageous to have a large number of transmit and receive antennas, for example four of each. However, while this may be practical for larger wireless devices such as laptop computers, it is impractical for smaller hand-held devices because it is not possible to get the antennas far enough apart to ensure their independence. Because of this, for hand-held devices, a practical limit might be two transmit and two receive antennas. Also, another factor limiting the practical number of antennas is cost. Typically about two thirds of the cost of a base station transceiver is in the power amplifier plus antennas, and this will increase if more antennas are added. These factors make only a two by two system commercially practical.

By way of example, consider a system with M transmit and N receive antennas in a frequency non-selective, slowly fading channel. The sampled baseband-equivalent channel model is given by $$Y = HS + \eta$$

where $H \in C^{N \times M}$ is the complex channel matrix with the (i,j)-th element being random fading between the i-th receive and j-th transmit antenna. $\eta \in C^N$ is the additive noise source and is modelled as a zero mean circularly symmetric complex Gaussian random vector with statistically independent elements, that is $\eta \sim CN(0, 2_\eta^2 I_N)$. The i-th element of $S \in C^M$ is the symbol transmitted at the i-th transmit antenna and that of $Y \in C^N$ is the symbol received at the i-th received antenna. The model is shown in FIG. 2.

That such a system has no improvement in SNR performance can be explained by noting that the data symbol $s_m$ is transmitted only by one antenna, and in case of full cancellation of other transmit antennas, the model of such a system is shown in FIG. 3. In this case there is one transmit antenna and N receive antennas. Therefore, for symbol $S_m$ there is no coding gain.

It would be advantageous to have a layered space-time coding structure which provides the improved spectral efficiency, but which also provides improved SNR performance.

SUMMARY OF THE INVENTION

Embodiments of the invention provide coding gain systems and methods which feature combined space-time coding and spatial multiplexing, and transmitters adapted to include such functionality. The space-time coding introduces a coding gain, and makes symbols more immune to fading since each information component is represented somehow in each spatial output. In some embodiments, the space-time coding comprises a layered space-time architecture. Advantageously, these solutions are amenable to implementation with two transmit antennas and two receive antennas, a configuration suitable for hand-held devices.

According to one broad aspect, the invention provides a coding gain system adapted to transmit a plurality M of symbol substreams. The coding gain system has a space-time coding function adapted to produce M space-time coded streams, with each symbol of the M symbol substreams being represented in all M space-time coded streams and at different times. In some embodiments, the coding gain system provided by the invention can be considered to include M transmit antennas each adapted to transmit a respective one of the M space-time coded streams, and/or demultiplexing and encoding functionality adapted to produce the M symbol substreams from a primary input stream.

In some embodiments, the space-time coding function has an orthogonal transform adapted to produce M orthogonal outputs each of which is a function of the M substreams, and has delay elements adapted to insert delays in the M orthogonal outputs to produced M delayed orthogonal outputs such that each of the M delayed orthogonal outputs is a function of a given element of each of the M substreams at a different time. For example, the delay elements can be adapted to introduce a delay of m−1 symbol periods in the mth orthogonal output, where m=1, . . . , M.

In another embodiment, the space-time coding function has delay elements adapted to insert a delay of M−1 symbol periods in each of the M substreams, and an orthogonal transform adapted to produce M orthogonal outputs, with the mth orthogonal output being a function of the M substreams delayed in the delay elements by m−1 symbol periods.

In some embodiments the M substreams are non-binary symbols. In other embodiments the M substreams are bit streams. In these embodiments, the orthogonal transform comprises orthogonal symbol mappings, for example M $2^M$ QAM or MPSK mapping functions, each adapted to produce a respective sequence of M-ary symbols with the M-ary symbol of the mth $2^M$ QAM mapping function being a function of the M substreams delayed in said delay elements by m−1 bit periods.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Embodiments of the invention provide a layered space-time architecture with additional gain provided with space-time coding. To achieve this each information symbol $s_m$ is arranged to as to be represented on all M Transmit Antennas. An algorithm of space-time coding is developed for one transmitter, and aggregated with algorithms for M transmitters, so that the spectral efficiency expected for conventional BLAST architecture is retained.

Figure 1:
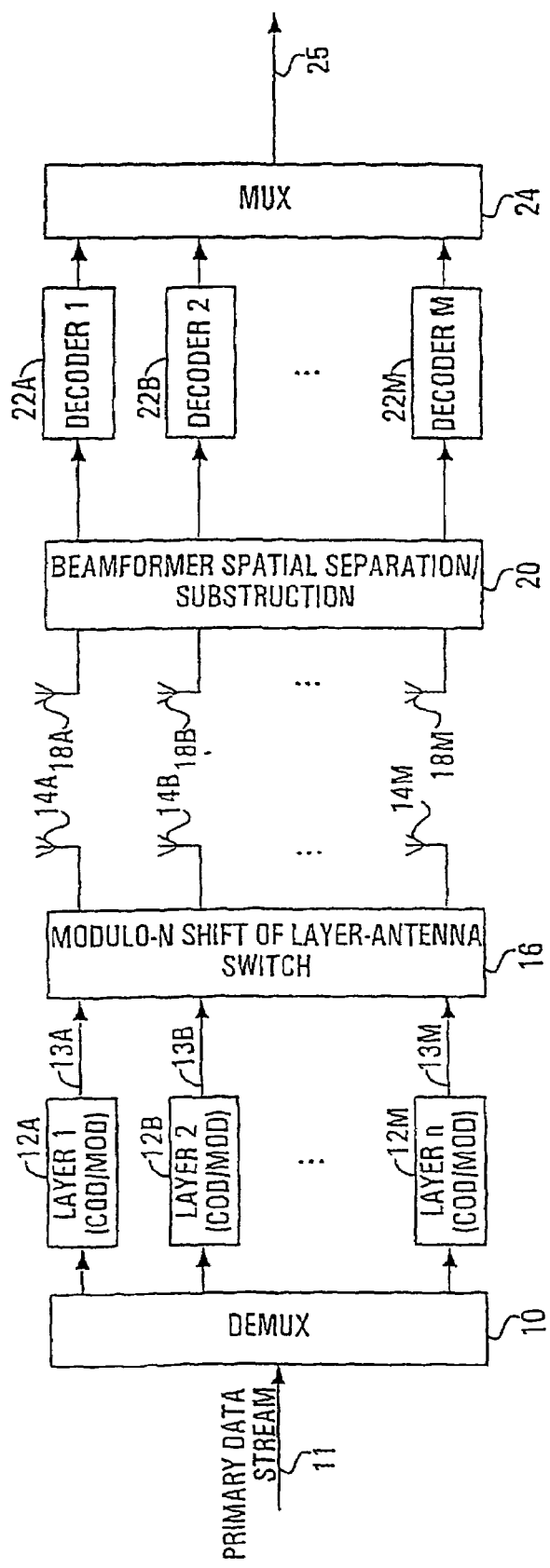
FIG. 1 is a block diagram of a known space-time coding system.
Figure 2:
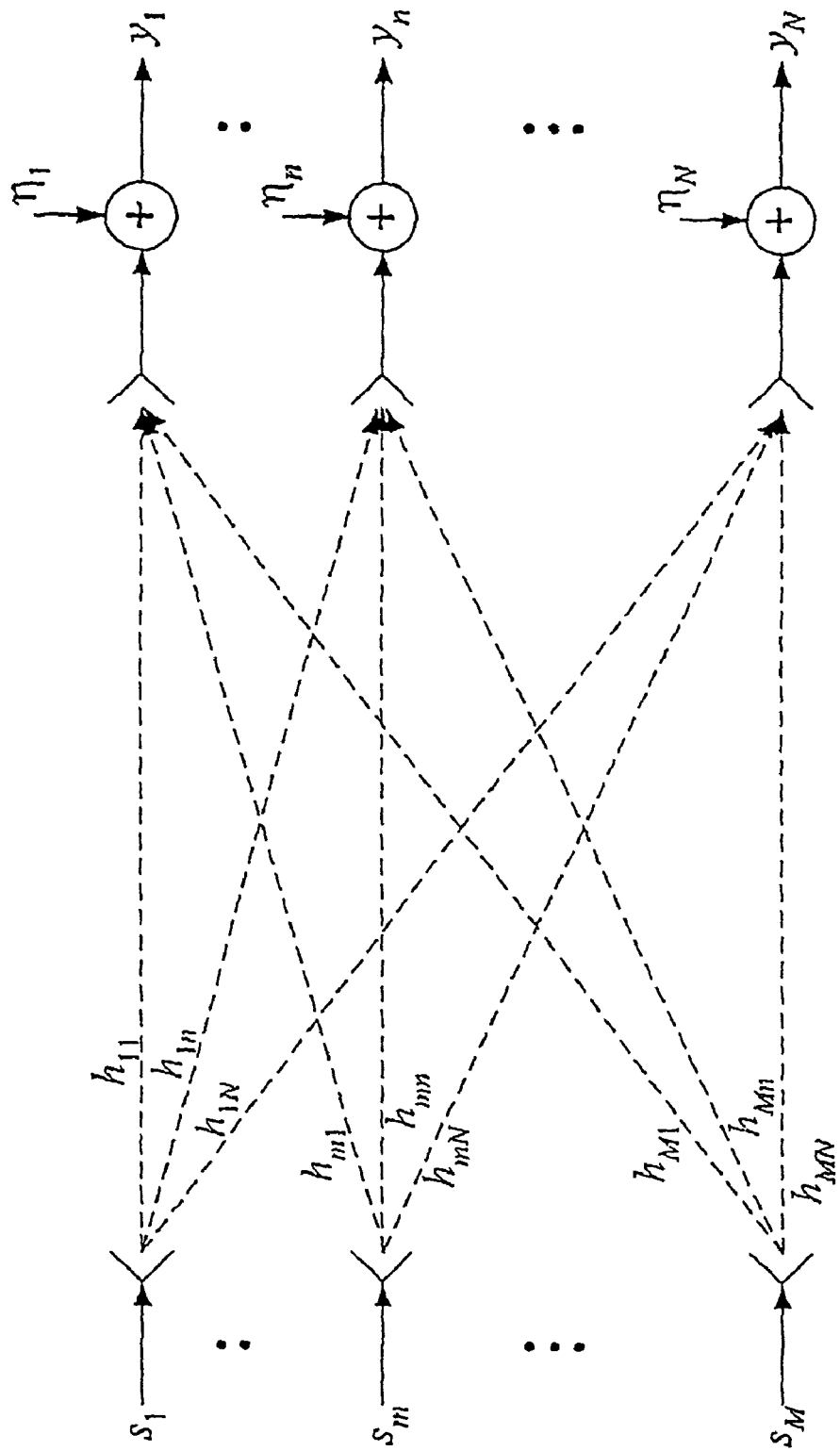
FIG. 2 is a channel model for the system of FIG. 1.
Figure 3:
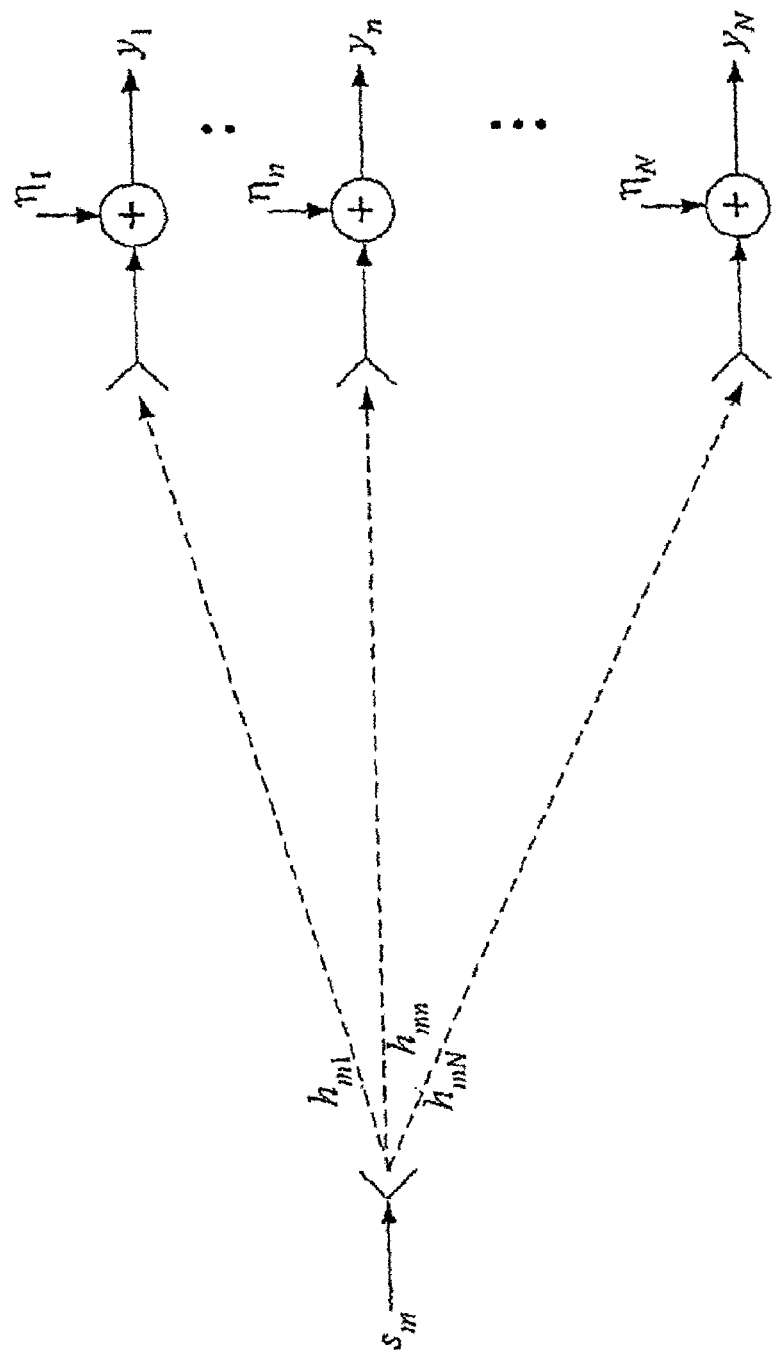
FIG. 3 is a channel model for a single antenna output of the system of FIG. 1.
Figure 4:
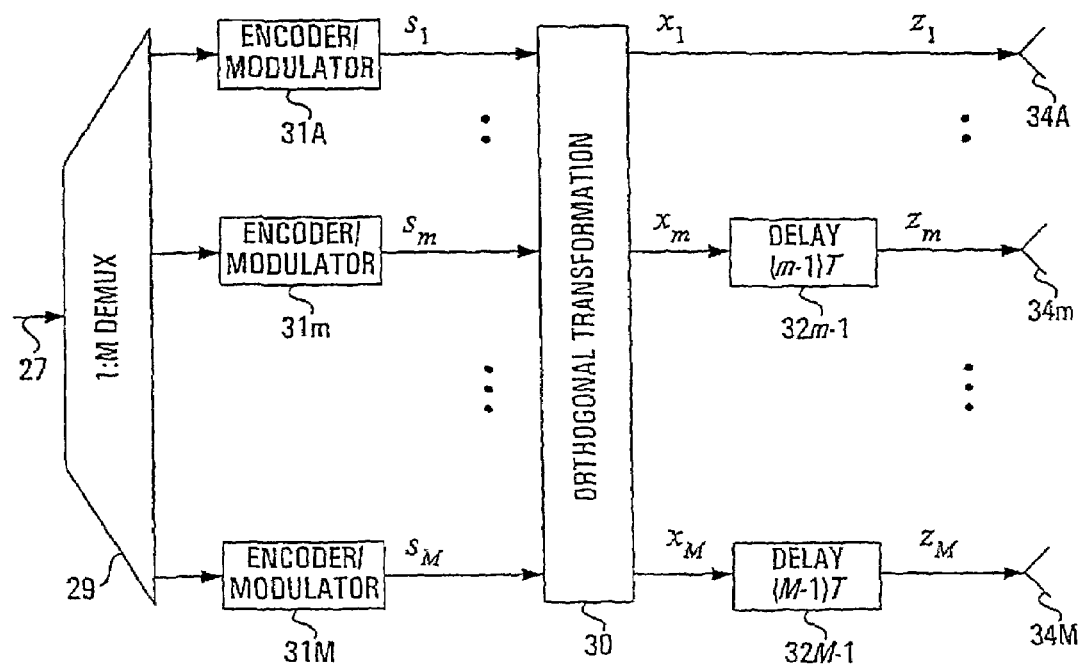
FIG. 4 is a block diagram of a transmitter featuring a coding gain system provided by an embodiment of the invention.

A range of coding gain methods/systems and transmitters are provided which combine space time coding and spatial multiplexing. Referring firstly to FIG. 4, shown is a space-time coder/multiplexer coding gain system consisting of a 1:M demultiplexer 29 having a single primary input 27 and having M outputs which are each coded and modulated in respective encoder/modulator blocks 31A, . . . , 31M to produce encoded substreams $s_1, s_2, \ldots, s_M$. There is an orthogonal transformation block 30 and a number of delay blocks 32 (only two shown, 32m−1, 32M−1) the outputs of which are connected to respective transmit antennas 34A, . . . , 34M. The orthogonal transformation block 30 has as its inputs the M encoded and modulated substreams $s_1, s_2, \ldots, s_M$. The orthogonal transformation block 30 performs the following matrix transform on the input substreams at each symbol interval:

X=FS, where $S=(s_1, s_2, \ldots s_M)$ at a given instant, $X=(x_1, x_2, \ldots, x_M) \in C^M$ is the output of the orthogonal transformation block 30; and $F \in C^{M \times M}$ is a complex matrix defining the orthogonal transformation. In one embodiment, the (i,m)-th element of F is defined by:

$$f_{im} = (\text{Had}(i,m) \cdot e^{j(\pi(ml))/(2M)})/(\sqrt{M}),$$

where $\text{Had}(i,m) \in (1; -1)$ is the (i,m)-th element of the Hadamard matrix. For M=2 this matrix is $$F = \frac{1}{\sqrt{2}} \begin{bmatrix} 1 & e^{j\pi/4} \\ 1 & -e^{j\pi/4} \end{bmatrix}.$$

However, this transformation matrix is not unique, this being only an example of a suitable orthogonal transformation. The optimization and/or search for the best of transformation matrix depends on the modulation for initial symbols $s_m$ and on the number of antennas M. It is important that each output of the orthogonal transformation be a function of all the instantaneous inputs. In other words, $x_1 = f_1(s_1, s_2, \ldots, s_M), \ldots, x_m = f_m(s_1, s_2, \ldots, s_M)$.

Now, to achieve the separation in time, the mth orthogonal transformation output xm is delayed by a time period equal to (m−1)T, where T is the symbol duration, such that the first output $x_1$ experiences no delay, and the Mth output $x_M$ experiences a delay of (M−1)T. The output of the delay blocks 32 consists of the symbols $z_1, \ldots, z_M$ to be transmitted on the antennas 34. The effect of the orthogonal transformation 30 plus the delay blocks 32 is that the mth input symbol $s_m$ is represented in all m output streams, but at different times.

Figure 5:
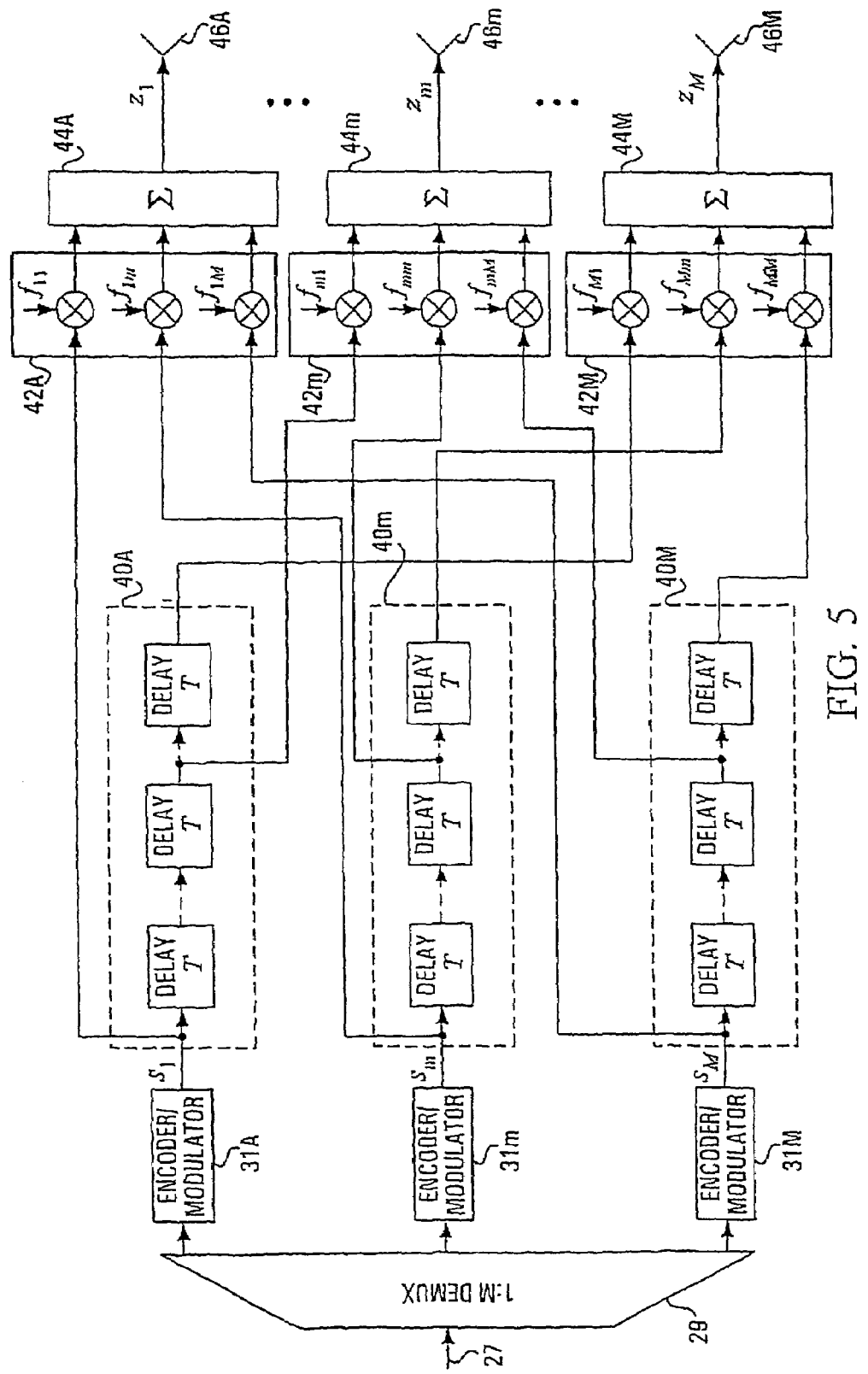
FIG. 5 is a block diagram of a transmitter featuring a coding gain system provided by another embodiment of the invention.

Referring now to FIG. 5, another embodiment of the invention is provided in which the encoded and modulated symbols $s_m$ are fed through respective delay banks 40 (40A, . . . , 40M) each containing M−1 delay elements. Each symbol with equal delay is fed to a common scaling block 42. Thus, all undelayed symbols $s_1, \ldots, s_M$ are fed to a first scaling block 42a, the symbols $s_1, \ldots, s_M$ delayed by (m−1)T are fed to an mth scaling block 42m and so on. Each scaling block 42m multiplies each of its inputs by a respective complex multiplier, and the results are summed in a respective summer 44m the output of which is the mth transmitted symbol $z_m$. This is really mathematically equivalent to the embodiment of FIG. 4 in that each output symbol $z_m$ is again a function of all of the input symbols at a given instant, but at different times. Effectively, the delay block and the orthogonal transformation functions have been done in reverse order.

Figure 6:
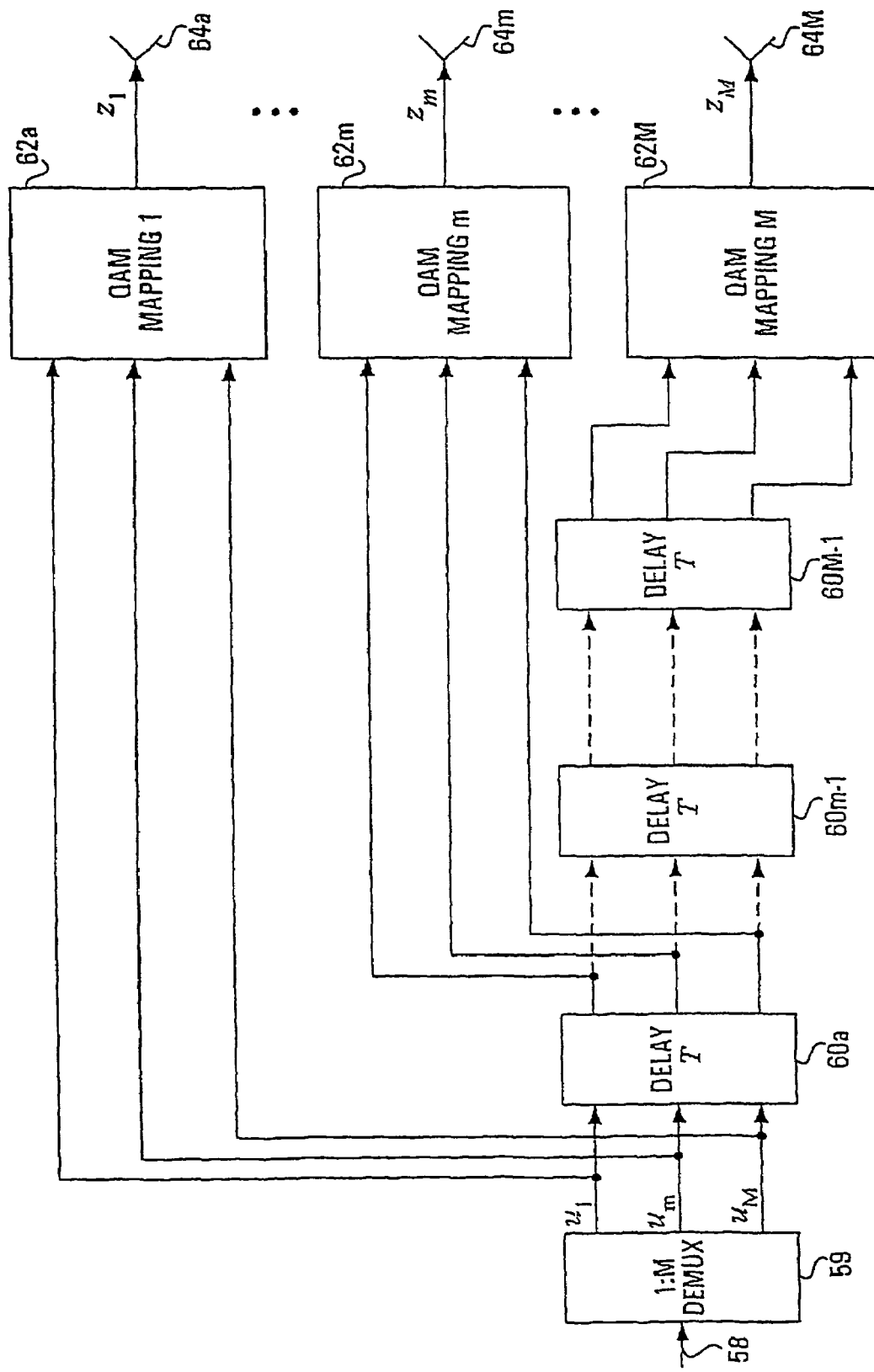
FIG. 6 is a block diagram of a transmitter featuring a coding gain system provided by another embodiment of the invention.

Both the examples of FIGS. 4 and 5 perform symbol level space-time encoding in the sense that the input to the space-time encoding process consists of symbols output by the encoder/modulator blocks. Referring now to FIG. 6, another embodiment of the invention is provided in which bit-level space-time encoding is performed. In this embodiment, a 1:M demultiplexer 59 produces from an input bit stream 58 M bit substreams $u_1, \ldots, u_M$ which are all fed into delay elements 60A, ..., 60M−1 each adding a further bit period T delay. The undelayed bits $u_1, \ldots, u_M$, and the bits output by each of the delay elements 60A, ..., 60M−1 are fed to respective symbol mapping functions 62a, ... 62M which in the illustrated embodiment are QAM functions. Each QAM mapping function 62A, ..., 62M maps its M input bits to a corresponding output symbol $z_m$ which is output by corresponding antennas 64A, ..., 64M. In one embodiment, the QAM mappings are designed such that they are orthogonal to each other.

Figure 7:
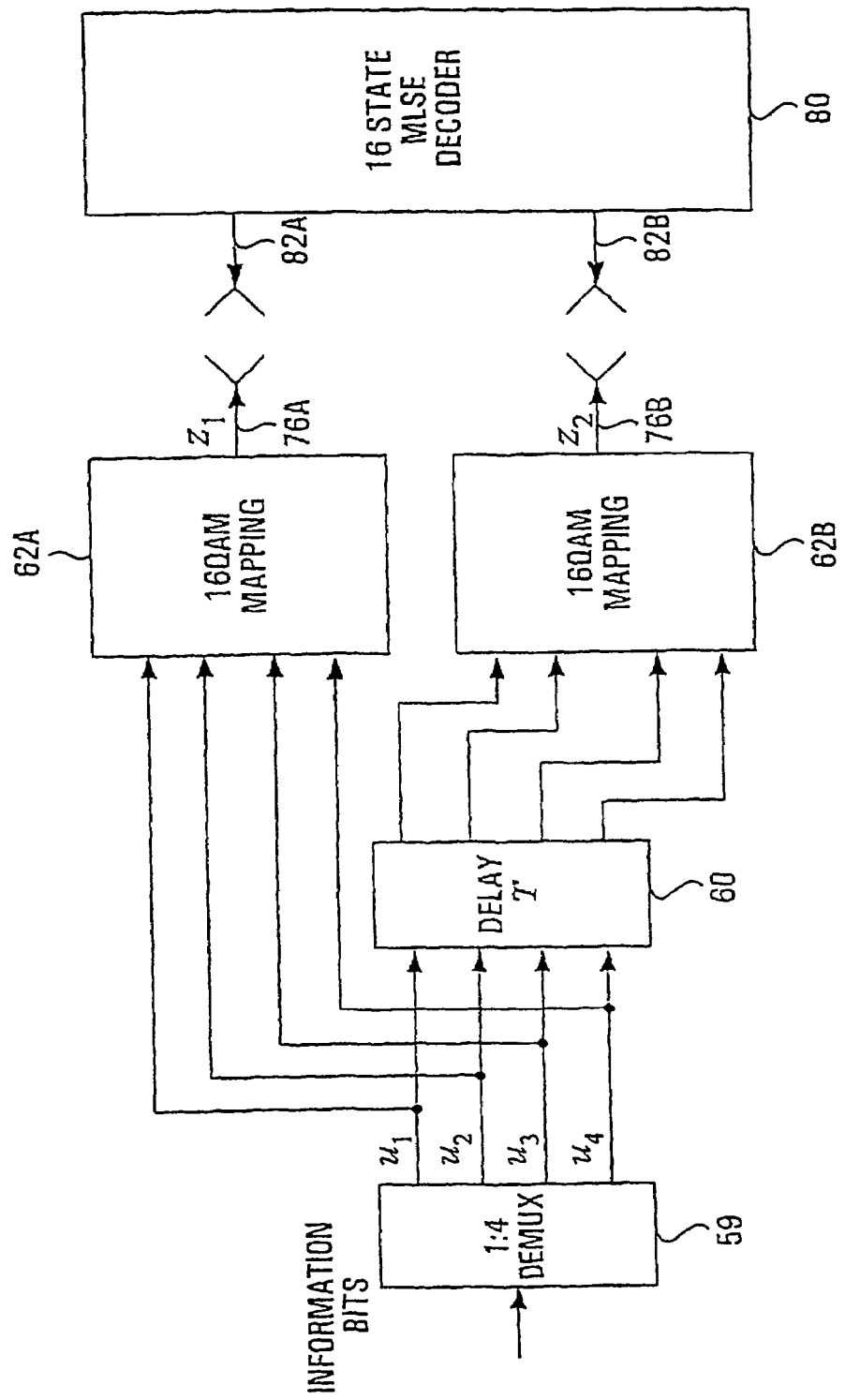
FIG. 7 is a block diagram of a transmitter featuring a coding gain system provided by another embodiment of the invention.

Referring now to FIG. 7 a specific example of the embodiment of FIG. 6 is shown which is a very practical embodiment, and in which the same numbering scheme as FIG. 6 is used. In this case, it is assumed that the demultiplexer 59 is a 1:4 demultiplexer which produces four bit substreams $u_1$, $u_2$, $u_3$, $u_4$ which are all fed undelayed to a first 16 QAM mapping 62A, and are all fed to a delay element 60 which introduces a delay T into the substreams and outputs the delayed substreams into a second 16 QAM mapping 62B. The two QAM mappings 62A, 62B have outputs $z_1$, $z_2$ fed to respective transmit antennas 64A, 64B. Details of an example receiver are shown in which there is a $2^M$ state MLSE decoder 80 connected to two receive antennas 82A, 82B. It is to be understood that many different receiver structures can be used, and this is not important to the invention. This implementation lends itself to efficient implementation in hand-held devices because there are only two transmit and two receive antennas.

Figure 8:
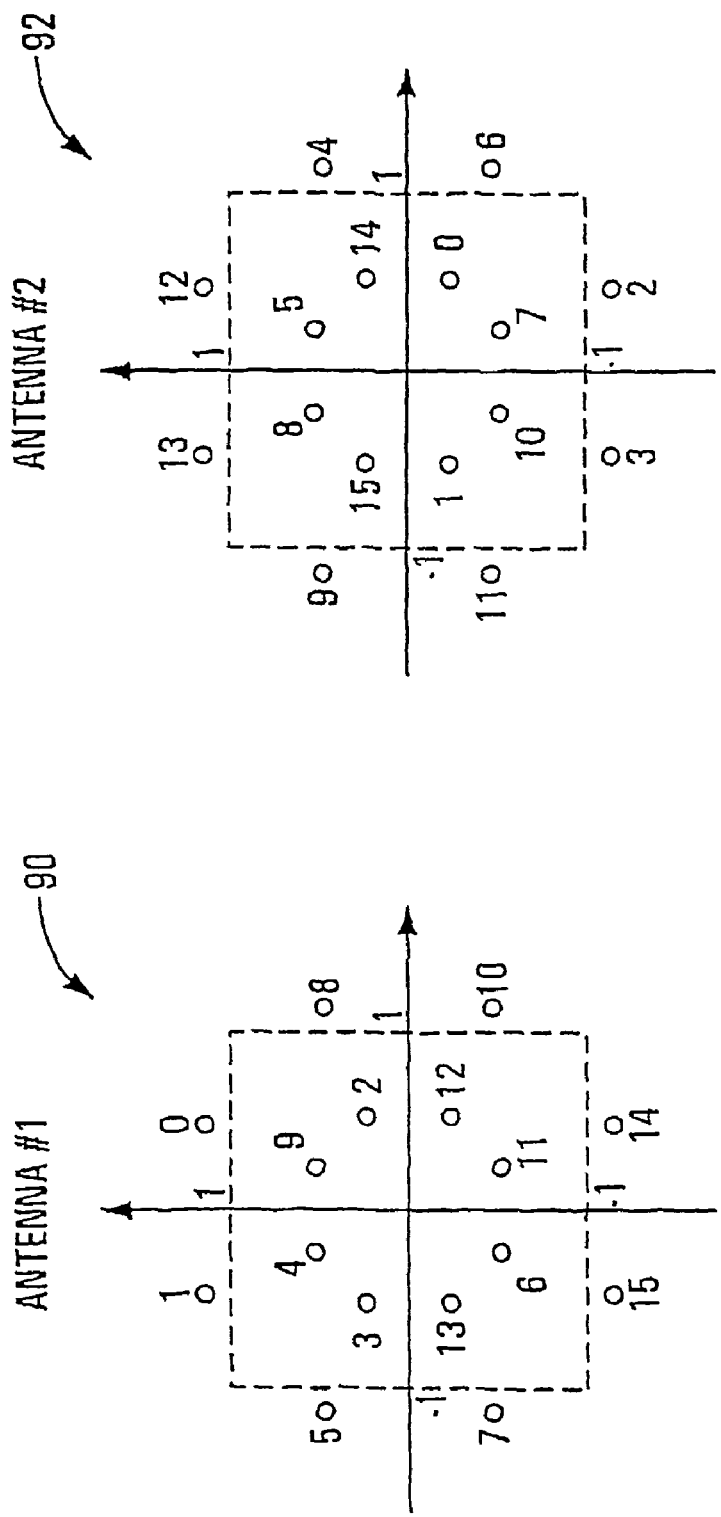
FIG. 8 is a constellation diagram for the 16 QAM Gray mappings of FIG. 7.

A recommended mapping for the 16 QAM mapping functions 62A, 62B is shown in FIG. 8. A first mapping is shown for the first antenna 64A, generally indicated by 90. A second mapping is shown for the second antenna 64B, generally indicated by 92. Each mapping shows how the 16 16QAM constellation points, defined by their position on the horizontal (real) and vertical (imaginary) axes, map to corresponding decimal versions (0 to 15) of input bit combinations $u_1$, $u_2$, $u_3$, $u_4$ (0000 to 1111).

In one example above, the receiver is a $2^M$ state MLSE decoder. As indicated previously, the particular receiver design is not important. It may be a Viterbi decoder, an iterative decoder, or some other type of decoder.

In the above embodiments, for symbol level space-time coding, it is assumed that the input to the space-time functionality consists of encoded and modulated symbol streams. In another embodiment, the encoding and modulation is integrated with the space-time coding.

Numerous modifications and variations of the present invention are possible in light of the above teachings. It is therefore to be understood that within the scope of the appended claims, the invention may be practised otherwise than as specifically described herein.

We claim:

1. A transmitter adapted to process a plurality M of symbol substreams, the transmitter comprising:
    a space-time coding block adapted to produce M space-time coded symbols per input set of M symbols, each input set of M symbols comprising one symbol per symbol substream, each of the M space-time coded symbols being included in a respective one of M space-time coded streams, wherein each symbol of the M symbol substreams is represented in all M space-time coded streams, wherein the transmitter comprises a delay arrangement, arranged such that for each symbol of the M symbol substreams a time of representation of the symbol in the M space-time coded streams is different for each of the M space-time coded streams, each space-time coded symbol comprising a representation of a symbol of each of the M symbol substreams;
    a plurality M of transmit antennas each adapted to transmit a respective one of the M space-time coded streams, such that for each symbol of each input set of M symbols, the M space-time coded symbols that contain a representation of the symbol are transmitted at different times.

2. A transmitter according to claim 1 further comprising a demultiplexing and encoding block comprising a demultiplexer having M outputs, and M encoder/modulators each producing a respective one of the M symbol substreams, with each of the M encoder/modulators connected to receive a respective one of the demultiplexer outputs.

3. A transmitter according to claim 2 wherein the demultiplexing and encoding block is adapted to produce the M symbol substreams from an input stream.

4. A transmitter according to claim 3 wherein the space-time coding block comprises:
    an orthogonal transform adapted to produce M orthogonal outputs each of which is a function of the M substreams;
    wherein the delay arrangement comprises delay elements adapted to insert a respective different delay in M−1 of the M orthogonal outputs to produce the M space-time coded streams.

5. A transmitter according to claim 4 wherein the delay elements are adapted to introduce a delay of m−1 symbol periods in the mth orthogonal output, where m=1, ..., M.

6. A transmitter according to claim 1 wherein the delay arrangement comprises:
    delay elements adapted to insert a delay in at least one of the M substreams; and
    the space-time coding function further comprises an orthogonal transform adapted to produce M orthogonal outputs, with the mth orthogonal output being a function of the M substreams delayed in said delay elements by m−1 symbol periods.

7. A transmitter according to claim 6 wherein the M substreams are bit streams, and wherein the orthogonal transform comprises M M-ary mapping functions, each adapted to produce a respective sequence of M-ary symbols with the M-ary symbol of the mth M-ary mapping function being a function of the M substreams delayed in said delay elements by m−1 bit periods.

8. A method comprising:
    demultiplexing an input symbol stream into M symbol substreams;
    performing coding and modulation on each of said M symbol substreams;
    performing a space-time coding function adapted to produce M space-time coded symbols per input set of M symbols, each input set of M symbols comprising one symbol per symbol substream, each of the M space-time coded symbols being included in a respective one of M space-time coded streams, wherein each symbol of the M symbol substreams is represented in all M space-time coded streams, wherein performing the space-time coding function comprises implementing a delay function, arranged such that-for each symbol of the M symbol substream, a time of representation of the symbol in the M space-time coded streams is different for each of the M space-time coded streams, each space-time coded symbol comprising a representation of a symbol of each of the M symbol substreams;

transmitting the M space-time coded streams on respective antennas, such that for each symbol of each input set of M symbols, the M space-time coded symbols that contain a representation of the symbol are transmitted at different times.

9. A method according to claim 8 wherein performing the space-time coding function comprises:

executing an orthogonal transform to produce M orthogonal outputs each of which is a function of the M substreams; and implementing the delay function comprises delaying the M orthogonal outputs to produce M delayed orthogonal outputs such that each of the M delayed orthogonal outputs is a function of a given element of each of the M substreams at a different time.

10. A method according to claim 9 wherein the mth orthogonal output is delayed by m−1 symbol periods, where m=1, ..., M.

11. A method according to claim 8 wherein performing the space-time coding function comprises:

delaying at least one of the M substreams executing an orthogonal transform adapted to produce M orthogonal outputs, with the $m^{th}$ orthogonal output being a function of the M substreams delayed m−1 symbol periods.

12. A method according to claim 11 wherein the M substreams are bit streams, and wherein the orthogonal transform comprises M M-ary mapping functions, each adapted to produce a respective sequence of M-ary symbols with the M-ary symbol of the $m^{th}$ M-ary mapping function being a function of the M substreams delayed in said delay elements by m−1 bit periods.

* * * * *